US008816820B2

(12) United States Patent
Huseth et al.

(10) Patent No.: US 8,816,820 B2
(45) Date of Patent: Aug. 26, 2014

(54) SYSTEM FOR SYNTHETIC VISION

(75) Inventors: Steve D. Huseth, Plymouth, MN (US); Amit Kulkarni, Medina, MN (US)

(73) Assignee: Honeywell International Inc., Morristown, NJ (US)

( * ) Notice: Subject to any disclaimer, the term of this patent is extended or adjusted under 35 U.S.C. 154(b) by 206 days.

(21) Appl. No.: 13/096,435

(22) Filed: Apr. 28, 2011

(65) Prior Publication Data
US 2012/0274446 A1  Nov. 1, 2012

(51) Int. Cl.
*G08B 5/22* (2006.01)

(52) U.S. Cl.
USPC ............... 340/8.1; 340/539.15; 340/539.18

(58) Field of Classification Search
USPC .................... 340/8.1, 539.15, 539.18
See application file for complete search history.

(56) References Cited

U.S. PATENT DOCUMENTS

| | | | |
|---|---|---|---|
| 5,389,934 A | 2/1995 | Kass | |
| 5,923,294 A | 7/1999 | Bacelon et al. | |
| 7,102,510 B2 | 9/2006 | Boling et al. | |
| 7,203,497 B2* | 4/2007 | Belcea | 455/446 |
| 7,205,930 B2 | 4/2007 | Ho et al. | |
| 7,246,008 B2 | 7/2007 | Daubert et al. | |
| 7,263,379 B1* | 8/2007 | Parkulo et al. | 455/521 |
| 7,330,150 B1 | 2/2008 | Beason et al. | |
| 7,457,705 B2 | 11/2008 | Takahashi et al. | |
| 7,598,856 B1 | 10/2009 | Nick et al. | |
| 2004/0021569 A1 | 2/2004 | Lepkofker et al. | |
| 2005/0001720 A1 | 1/2005 | Mason et al. | |
| 2006/0148423 A1 | 7/2006 | Sharpe | |
| 2007/0103292 A1 | 5/2007 | Burkley et al. | |
| 2009/0073045 A1 | 3/2009 | Supino et al. | |
| 2011/0007901 A1* | 1/2011 | Ikeda et al. | 380/270 |
| 2011/0248847 A1 | 10/2011 | Huseth et al. | |

OTHER PUBLICATIONS

"U.S. Appl. No. 12/756,557, Non Final Office Action mailed Aug. 9, 2012", 16 pgs.
"Australian Application Serial No. 2012202254, Voluntary Amendments filed Apr. 18, 2012", 1 pg.
"European Application Serial No. 12164468.6, European Search Report mailed Aug. 27, 2012", 3 pgs.
"U.S. Appl. No. 12/756,557, Advisory Action mailed Mar. 7, 2013", 3 pgs.
"U.S. Appl. No. 12/756,557, Examiner Interview Summary mailed Mar. 29, 2013", 3 pgs.
"U.S. Appl. No. 12/756,557, Final Office Action mailed Dec. 21, 2012", 21 pgs.
"U.S. Appl. No. 12/756,557, Response filed Feb. 21, 2013 to Final Office Action mailed Dec. 21, 2012", 12 pgs.
"U.S. Appl. No. 12/756,557, Response filed Nov. 9, 2012 Non Final Office Action mailed Aug. 9, 2012", 21 pgs.

(Continued)

*Primary Examiner* — Brian Zimmerman
*Assistant Examiner* — Bhavin M Patel
(74) *Attorney, Agent, or Firm* — Schwegman Lundberg & Woessner, P.A.

(57) ABSTRACT

A first mobile device includes a location processor, a communication processor, and a display, and a second mobile device includes a location processor and a communication processor. The first mobile device is configured to wirelessly communicate with the second mobile device, and the first mobile device is configured to display a superimposed icon representing a location of the second mobile device as viewed from the perspective of the first mobile device when the first mobile device is pointed in the direction of the second mobile device.

20 Claims, 5 Drawing Sheets

(56) References Cited

OTHER PUBLICATIONS

"European Application Serial No. 12164468.6, Office Action mailed Sep. 19, 2012", 5 pgs.

"European Application Serial No. 12164468.6, Response filed Jan. 18, 2013 to Examination Notification Art. 94(3) mailed Sep. 19, 2012", 12 pgs.

"European Application Serial No. 12164468.6, Examination Notification Art. 94(3) mailed Nov. 12, 2013", 3 pgs.

* cited by examiner

SYSTEM FOR SYNTHETIC VISION

TECHNICAL FIELD

The present disclosure relates to a system for synthetic vision.

BACKGROUND

Firefighters at the scene of a major incident are faced with the loss of both hearing and vision. Dense smoke can reduce visibility to inches, and ambient noise levels from a major fire can reach 85 decibels. Infrared cameras can help in search and rescue operations by providing information that can be used in identifying a building's structural elements such as exits. Information from the infrared cameras can further assist in locating firefighters lost in the building. However, identifying other structural elements such as hallways and stairways in a building remains largely a best guess endeavor, which can only be supplemented by feeling through debris and damaged structures.

DETAILED DESCRIPTION

Location systems are emerging in which a firefighter or other rescuer can be precisely placed on a three dimensional representation of a building or other structure. In addition, the structure of the building can be synthesized by a location system, and the location of firefighters in the building can be determined in a synthesized map. This provides an incident commander with a perspective of where each firefighter is located in the building, and further provides some level of building information such as the hallways and stairs within the building. Consequently, the incident commander may have a clear picture of the building topology and the location of the firefighters. However, the rescue of a downed firefighter still remains a process of the incident commander verbally issuing directions to the rescue team to maneuver through the building to the lost firefighter. Incorrect map data and confusion from the incident commander's verbal instructions can result in the loss of critical time, thereby reducing the effectiveness of the rescue team. In addressing this state of the art, an embodiment provides the rescue team with a rendering of the relative positions of location processors so that the rescue team can find a firefighter in need of assistance. Another embodiment renders a display of a building structure together with the relative position of the lost firefighter from the context of the rescue team, thereby allowing a more efficient rescue operation. Although embodiments of the current disclosure are explained in connection with locating a lost firefighter, one of skill in the art would realize that the embodiments are not limited to this particular use.

One or more embodiments include a display device with wireless data communication capability and a location processor that optionally uses three dimensional building map data together with information on the precise location and orientation of a firefighter who is carrying the display to generate a three dimensional synthetic image of the physical location of the firefighter. The mobile device can be carried by an individual firefighter by either wearing or carrying the device. The wireless data communication capabilities allow the mobile device to communicate with another mobile device and/or a remote database containing building map information. The three dimensional image allows the firefighter to maneuver in an environment of reduced visibility as a result of the smoke and fire conditions. Additionally, the display can include building structures such as stairways, hallways, and other features that are not visible due to their location on different floors, or due to their location behind walls. Such a display provides the necessary visual context to allow the firefighter to affect a rescue by maneuvering in obscured environments as well as to "see" people and objects of interest through smoke and building structures.

In an embodiment with the remote database, the remote database contains the locations of all the firefighters at the scene of an incident. Since the specific positions and orientations of the rescuing firefighters, as well as the firefighter being rescued, are known, and further since a three dimensional model of the building is available, the mobile device is able to obtain this data from the remote database, and is further able to synthesize a replica of the inside of the building from the perspective of the firefighter holding the display. As previously noted, in embodiments without a display of a building topology, the relative positions of mobile devices can be displayed on the mobile devices. The mobile device can add details to the display that are not visible to the firefighter, such as the location of a lost firefighter on a different floor or behind a wall. These details can be a simple horizontal and vertical distance between two mobile devices, or the display of a location of a mobile device on a detailed building map of the mobile device. Such a display can present details of the firefighter's physical surroundings that are occluded first by smoke and fire, and second by floors and walls. Since both orientation and distance are determined by the location system, when a firefighter points the device in the direction of the lost firefighter, the system is able to superimpose the image of the person being sought in the correct perspective of the rescuer. In an embodiment wherein a three dimensional map is available, the position of the lost firefighter can be displayed in the three dimensional display.

As noted, in an embodiment, a detailed digital building map is available for use by the system. In another embodiment, the detailed digital building map is synthesized by the location processor within the system. Such a location processor accomplishes this via its ability to recognize key building structures such as halls, corners, and stairways. Additionally, the location system provides precise location and orientation information on where a firefighter is located as well as where the display is being pointed. The mobile device can synthesize on the display the view of the inside of the building in real-time from the user's perspective by adding both the visible and non-visible elements of the building structure. As the user points the display in different directions, the display is updated with the new perspective.

Figure 1A:
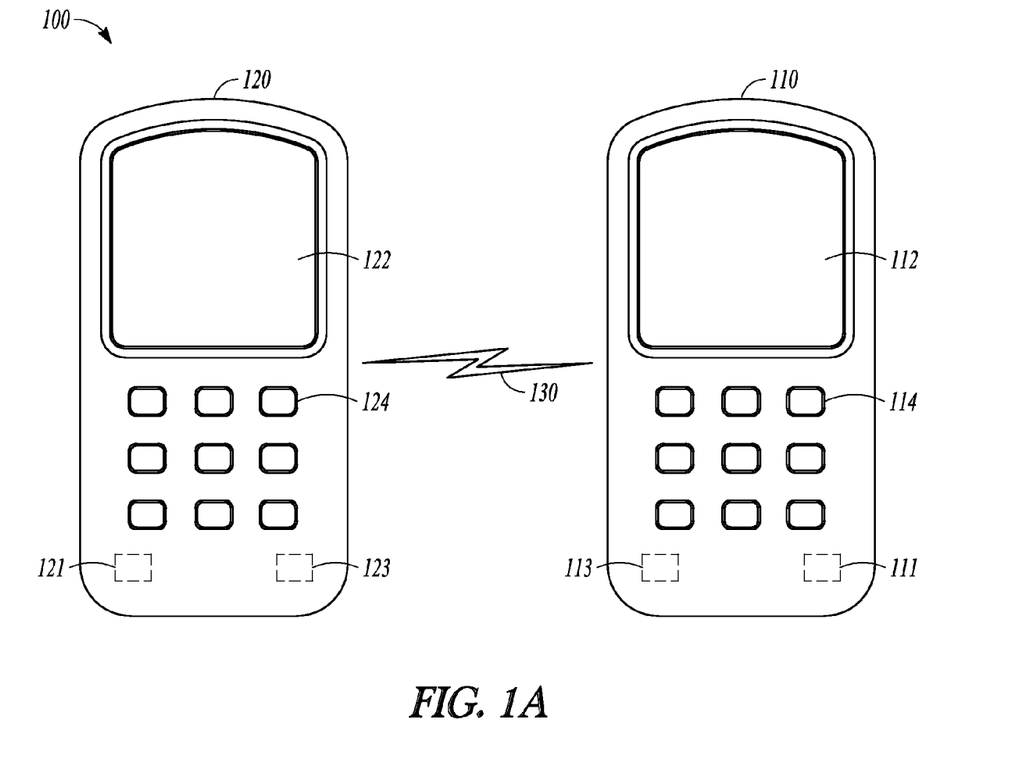
FIG. 1A is a diagram of mobile devices that can be used in connection with a system for synthetic vision.
Figure 1B:
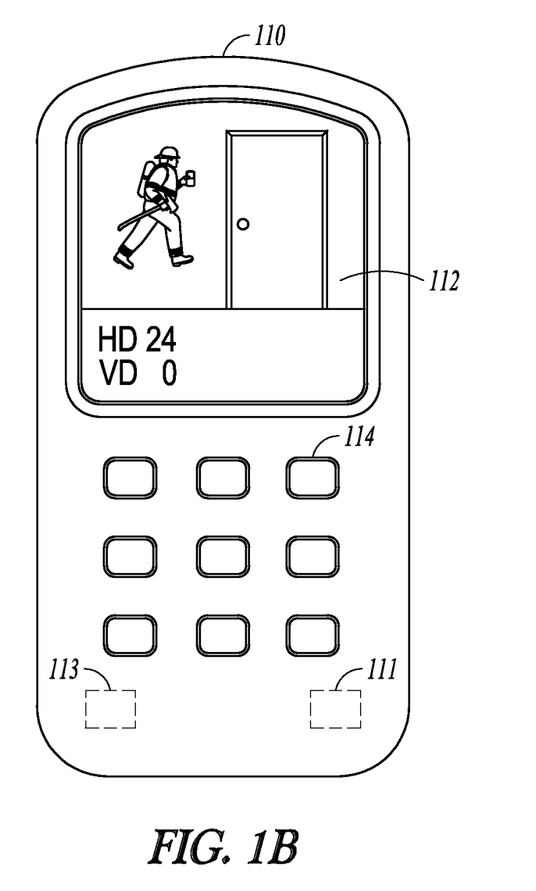
FIG. 1B illustrates a first mobile device displaying a superimposed relative position of a second mobile device.

FIG. 1A illustrates a system 100 that includes a first mobile device 110 and a second mobile device 120. The first mobile device 110 includes a location processor 111, a display unit 112, a communications processor 113, and input means 114. The second mobile device 120 includes a location processor 121, a display unit 122, a communications processor 123, and input means 124. The communication processors 113 and 123 permit the mobile devices 110, 120 to wirelessly communicate via link 130. When the first mobile device is pointed in the direction of the second mobile device, as determined by the location processors and communication processors on the first and second mobile devices, the display of the first mobile device is oriented or re-oriented as a function of the direction in which the mobile device is pointed, and the relative location of the second mobile device is superimposed on the display of the first mobile device. That is, the display on the first mobile device serves as synthetic vision for the user of the first mobile device. If a wall, floor, or other obstacle separates the first and second mobile devices, an icon of the second mobile device or an icon of a user of the second mobile device is displayed on the first mobile device, either superimposed in the building structure on the first mobile device or superimposed on the first mobile device without a building structure. In another embodiment, the first mobile device includes a visual or infrared camera, and the icon can be superimposed on an image captured by the visual or infrared cameras. This is illustrated in FIG. 1B, wherein on the first mobile device 110 is displayed the superimposed relative position of the user of the second mobile device. The horizontal and vertical distances between first mobile device 110 and second mobile device 120 can also be displayed. For example, in FIG. 1B, the device 110 displays that the superimposed icon of the person associated with the second mobile device is actually located at a horizontal distance (HD) of 24 feet and a vertical distance (VD) of 0 feet from the first mobile device (i.e., the second mobile device is located on the same floor as the first mobile device). FIG. 1B further shows that the icon is located on an opposite side of a wall, and a door is located just to the right of the location of the icon.

Figure 2:
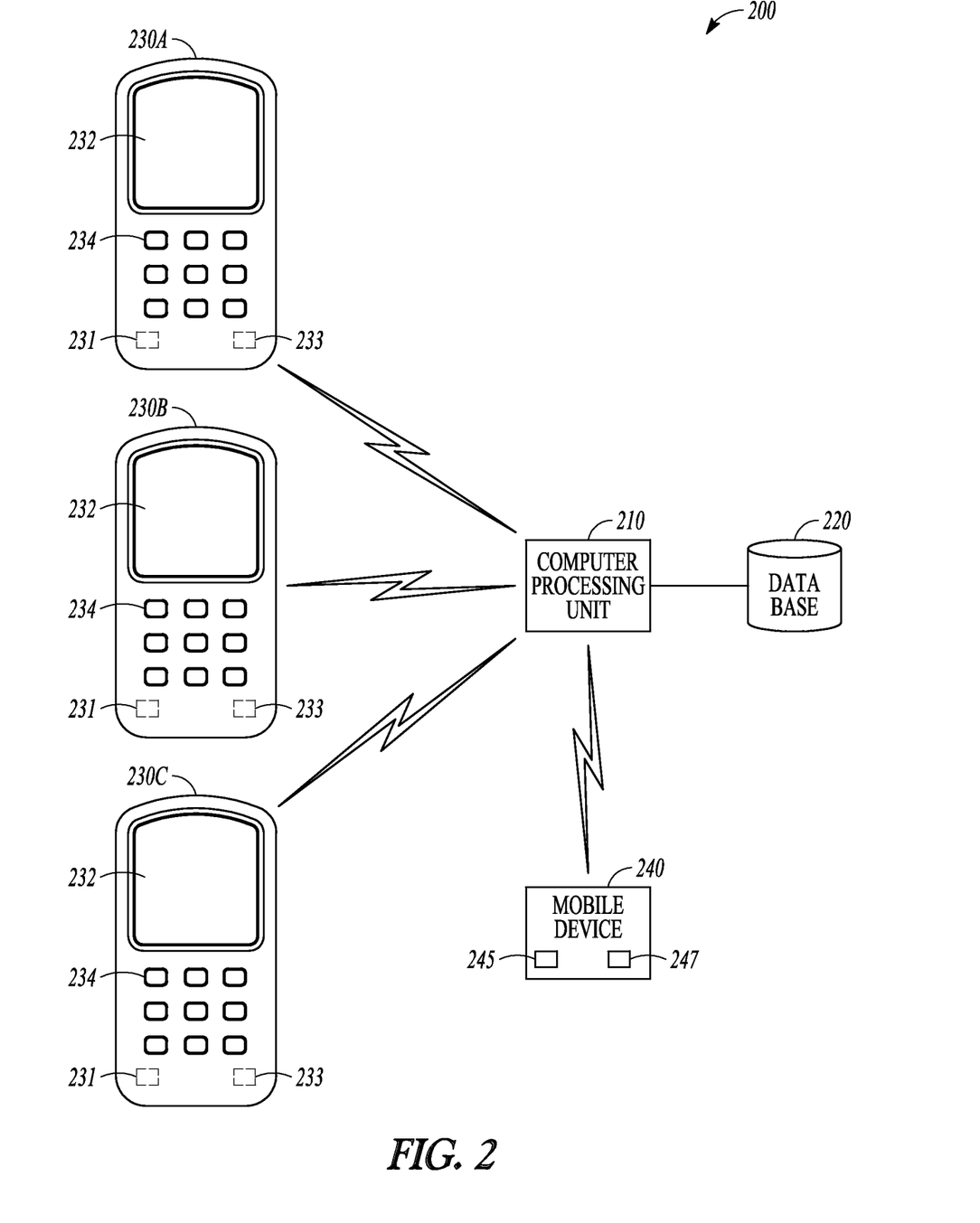
FIG. 2 is a block diagram of an example embodiment of a system for synthetic vision.

Referring to FIG. 2, a synthetic vision system 200 includes one or more computer processors 210, a data base 220, and one or more mobile devices 230A, 230B, and 230C. The mobile devices 230 include a display unit 232, control buttons 234, a location processor 231, and a communication processor 233. The location processor 231 can include and/or function in conjunction with a received signal strength indication (RSSI) processor, a plurality of identification tags and readers, an inertial guidance and location processor, and an ultra wide band radio processor. The one or more processors 210 are configured to read the database 220. The database 220 includes data relating to a topology of a building. The one or more processors 210 are configured to communicate with the one or more mobile devices via their communication processors 233. The one or more computer processors are further configured to communicate with a mobile device 240, which has within it a location processor 245, and a motion sensor, an inertial sensor, and/or a posture sensor 247, which can be used to determine that a firefighter associated with the second mobile device is incapacitated. The mobile device 240 can also have a display unit (not illustrated in FIG. 2). Mobile devices 230 and 240 can be hand carried, strapped to a belt, strapped to an arm or leg, or attached to a person in any other way known in the art.

Figure 3:
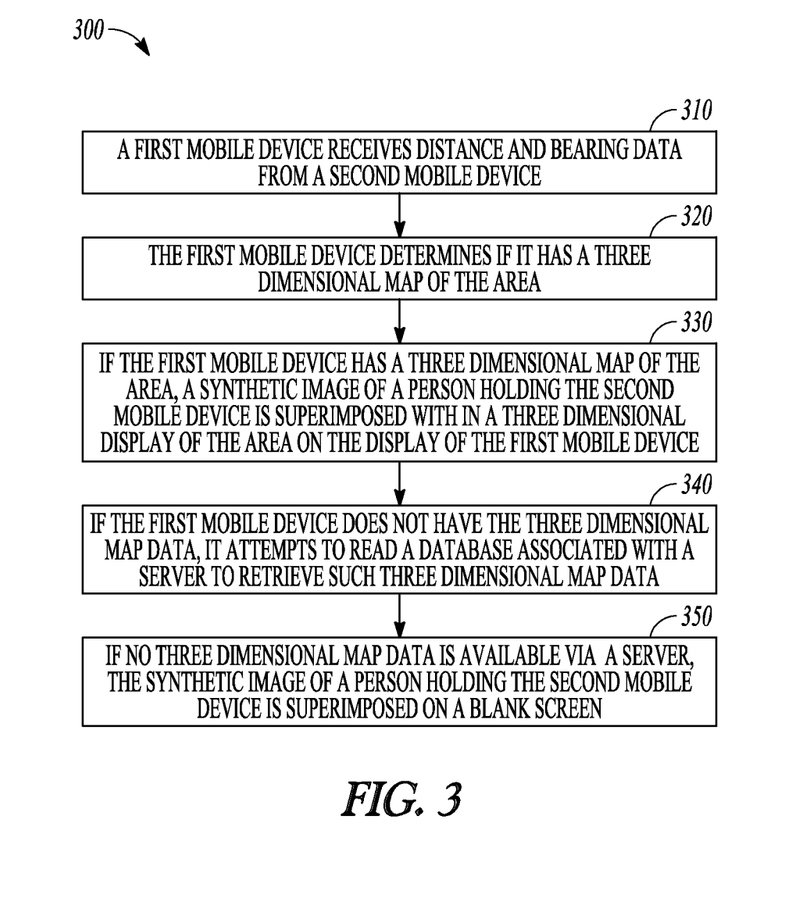
FIG. 3 is a flowchart of an example embodiment of a method of synthetic vision.
Figure 4:
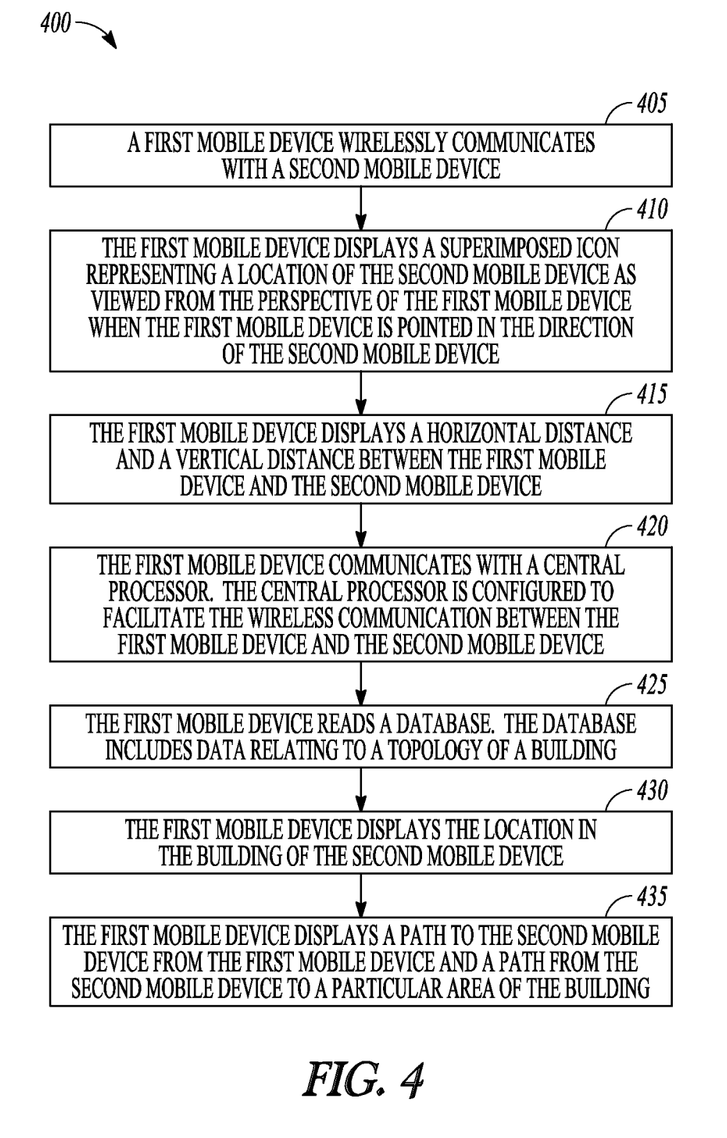
FIG. 4 is a flow chart of another example embodiment of a method of synthetic vision.

FIGS. 3 and 4 are flowcharts of example processes 300 and 400 for implementing a synthetic vision system. FIGS. 3 and 4 include a number of process blocks 310-350 and 405-435. Though arranged serially in the example of FIGS. 3 and 4, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 3, at 310, a first mobile device receives distance and bearing data from a second mobile device. At 320, the first mobile device determines if it has a three dimensional map of the area. At 330, if the first mobile device has three dimensional map data of the area, then a synthetic image of a person holding the second mobile device is superimposed within a three-dimensional display of the area on the display of the first mobile device (referred to as a peer to peer embodiment). At 340, if the first mobile device does not have the three dimensional map data, it attempts to read a database associated with a server to retrieve such three dimensional map data. At 350, if no three dimensional map data is available via a server, the synthetic image of a person holding the second mobile device is superimposed on a blank screen (also referred to as a peer to peer embodiment).

Referring to FIG. 4, the process 400 includes, at 405, a first mobile device wirelessly communicates with a second mobile device, and at 410, the first mobile device displays a superimposed icon representing a location of the second mobile device as viewed from the perspective of the first mobile device when the first mobile device is pointed in the direction of the second mobile device.

At 415, the first mobile device displays a horizontal distance and a vertical distance between the first mobile device and the second mobile device. At 420, the first mobile device communicates with a central processor. The central processor is configured to facilitate the wireless communication between the first mobile device and the second mobile device. At 425, the first mobile device reads a database. The database includes data relating to a topology of a building. At 430, the first mobile device displays the location in the building of the second mobile device. At 435, the first mobile device displays a path to the second mobile device from the first mobile device and a path from the second mobile device to a particular area of the building.

EXAMPLE EMBODIMENTS

Example No. 1 is a system that includes a first mobile device comprising a location processor, a communication processor, and a display, and a second mobile device comprising a location processor and a communication processor. The first mobile device is configured to wirelessly communicate with the second mobile device, and the first mobile device is configured to display a superimposed icon representing a location of the second mobile device as viewed from the perspective of the first mobile device when the first mobile device is pointed in the direction of the second mobile device.

Example No. 2 includes the features of Example No. 1, and optionally includes a system wherein the first mobile device is configured to display a horizontal distance and a vertical distance between the first mobile device and the second mobile device, and wherein the icon represents one or more of the second mobile device and a person holding the second mobile device.

Example No. 3 includes the features of Example Nos. 1-2, and optionally includes a system wherein the second mobile device comprises one or more of a motion sensor, an inertial sensor, and a posture sensor.

Example No. 4 includes the features of Example Nos. 1-3, and optionally includes a central processor. The central processor is configured to facilitate the wireless communication between the first mobile device and the second mobile device.

Example No. 5 includes the features of Example Nos. 1-4, and optionally includes a system wherein the first mobile device is configured to read a database. The database comprising data relating to a topology of a building. The first mobile device is further configured to display the location in the building of the second mobile device.

Example No. 6 includes the features of Example Nos. 1-5, and optionally includes a system wherein the display comprises a three dimensional image comprising multiple floors in the building.

Example No. 7 includes the features of Example Nos. 1-6, and optionally includes a system wherein the display includes features of the building including one or more of an exit, a stairwell, a wall, a door, and a window.

Example No. 8 includes the features of Example Nos. 1-7, and optionally includes a system wherein the first mobile device is configured to display a path to the second mobile device from the first mobile device, and a path from the second mobile device to a particular area of the building.

Example No. 9 includes the features of Example Nos. 1-8, and optionally includes a system wherein the first mobile device is configured to interact with one or more visual signaling devices and one or more audio signaling devices, the visual signaling devices and audio signaling devices indicating the path to the second mobile device and the path from the second mobile device.

Example No. 10 includes the features of Example Nos. 1-9, and optionally includes a system wherein the first mobile device is configured to display locations of a plurality of first mobile devices.

Example No. 11 is a system that includes a computer server, a database coupled to the computer server, the database comprising a topology of a building, and a plurality of mobile devices, the mobile devices comprising a display unit, a communication processor, and a location processor. The server is configured to read the database and to display an image of an interior of the building on the display unit, and the server is configured to determine a location within the building of a particular mobile device, and to display on the display unit a superimposed icon representing the location of the particular mobile device from the perspective of one of the plurality of mobile devices.

Example No. 12 includes the features of Example No. 11, and optionally includes a system wherein the location processor comprises one or more of a received signal strength indication (RSSI) processor, a plurality of identification tags and readers, an inertial guidance and location processor, and an ultra wide band radio processor.

Example No. 13 includes the features of Example Nos. 11-12, and optionally includes a system wherein the first mobile device is configured to determine an orientation of the first mobile device, and to orient the display of the interior of the building on the first mobile device as a function of the orientation of the first mobile device.

Example No. 14 includes the features of Example Nos. 11-13, and optionally includes a system wherein a mobile device comprises an image sensing device, and wherein the mobile device is configured to superimpose the icon on an image captured by the mobile device.

Example No. 15 includes the features of Example Nos. 11-14, and optionally includes a system wherein the second mobile device comprises one or more of a motion sensor, an inertial sensor, and a posture sensor.

Example No. 16 is a computer readable medium comprising instructions that when executed by a processor execute a process comprising causing a first mobile device to wirelessly communicate with a second mobile device, and causing the first mobile device to display a superimposed icon representing a location of the second mobile device as viewed from the perspective of the first mobile device when the first mobile device is pointed in the direction of the second mobile device.

Example No. 17 includes the features of Example No. 16, and optionally includes instructions causing the first mobile device to display a horizontal distance and a vertical distance between the first mobile device and the second mobile device; and wherein the icon represents one or more of the second mobile device and a person holding the second mobile device.

Example No. 18 includes the features of Example Nos. 16-17, and optionally includes instructions to cause the first mobile device to communicate with a central processor, the central processor configured to facilitate the wireless communication between the first mobile device and the second mobile device.

Example No. 19 includes the features of Example Nos. 16-18, and optionally includes instructions to read a database, the database comprising data relating to a topology of a building, and to display the location in the building of the second mobile device.

Example No. 20 includes the features of Example Nos. 16-19, and optionally includes instructions to cause the first mobile device to display a path to the second mobile device from the first mobile device, and a path from the second mobile device to a particular area of the building.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

The invention claimed is:

1. A system comprising:
    a first mobile device comprising a location processor, a communication processor, and a display; and
    a second mobile device comprising a location processor and a communication processor;
    wherein the first mobile device is configured to wirelessly communicate with the second mobile device; and
    wherein the first mobile device is configured to display, in a three dimensional synthetic image of a building structure, a superimposed icon representing a location of the second mobile device as viewed from the perspective of the first mobile device when the first mobile device is pointed in the direction of the second mobile device.

2. The system of claim 1, wherein the first mobile device is configured to display a horizontal distance and a vertical distance between the first mobile device and the second mobile device; and wherein the icon represents one or more of the second mobile device and a person holding the second mobile device.

3. The system of claim 1, wherein the second mobile device comprises one or more of a motion sensor, an inertial sensor, and a posture sensor.

4. The system of claim 1, comprising a central processor, the central processor configured to facilitate the wireless communication between the first mobile device and the second mobile device.

5. The system of claim 1, wherein the first mobile device is configured to:
   read a database, the database comprising data relating to a topology of a building; and
   display the location in the building of the second mobile device.

6. The system of claim 5, wherein the display comprises a three dimensional image comprising multiple floors in the building.

7. The system of claim 5, wherein the display includes features of the building including one or more of an exit, a stairwell, a wall, a door, and a window.

8. The system of claim 5, wherein the first mobile device is configured to display a path to the second mobile device from the first mobile device, and a path from the second mobile device to a particular area of the building.

9. The system of claim 5, wherein the first mobile device is configured to interact with one or more visual signaling devices and one or more audio signaling devices, the visual signaling devices and audio signaling devices indicating the path to the second mobile device and the path from the second mobile device.

10. The system of claim 1, wherein the first mobile device is configured to display locations of a plurality of the second mobile devices.

11. A system comprising:
   a computer server;
   a database coupled to the computer server, the database comprising a topology of a building; and
   a plurality of mobile devices, the mobile devices comprising a display unit, a communication processor, and a location processor;
   wherein the server is configured to read the database and to display an image of an interior of the building on the display unit; and
   wherein the server is configured to determine a location within the building of a particular mobile device, and to display on the display unit, in a three dimensional synthetic image of a building structure, a superimposed icon representing the location of the particular mobile device from the perspective of one of the plurality of mobile devices.

12. The system of claim 11, wherein the location processor comprises one or more of a received signal strength indication (RSSI) processor, a plurality of identification tags and readers, an inertial guidance and location processor, and an ultra wide band radio processor.

13. The system of claim 11, wherein the first mobile device is configured to determine an orientation of the first mobile device, and to orient the display of the interior of the building on the first mobile device as a function of the orientation of the first mobile device.

14. The system of claim 11, wherein a mobile device comprises an image sensing device, and wherein the mobile device is configured to superimpose the icon on an image captured by the mobile device.

15. The system of claim 14, wherein the second mobile device comprises one or more of a motion sensor, an inertial sensor, and a posture sensor.

16. A non-transitory computer readable medium comprising instructions that when executed by a processor execute a process comprising:
   causing a first mobile device to wirelessly communicate with a second mobile device; and
   causing the first mobile device to display, in a three dimensional synthetic image of a building structure, a superimposed icon representing a location of the second mobile device as viewed from the perspective of the first mobile device when the first mobile device is pointed in the direction of the second mobile device.

17. The non-transitory computer readable medium of claim 16, comprising instructions causing the first mobile device to display a horizontal distance and a vertical distance between the first mobile device and the second mobile device; and wherein the icon represents one or more of the second mobile device and a person holding the second mobile device.

18. The non-transitory computer readable medium of claim 16, comprising instructions to cause the first mobile device to communicate with a central processor, the central processor configured to facilitate the wireless communication between the first mobile device and the second mobile device.

19. The non-transitory computer readable medium of claim 16, comprising instructions causing the first mobile device to:
   read a database, the database comprising data relating to a topology of a building; and
   display the location in the building of the second mobile device.

20. The non-transitory computer readable medium of claim 19, comprising instructions to cause the first mobile device to display a path to the second mobile device from the first mobile device, and a path from the second mobile device to a particular area of the building.

\* \* \* \* \*